United States Patent [19]
Seagraves

[11] Patent Number: 5,652,880
[45] Date of Patent: Jul. 29, 1997

[54] APPARATUS AND METHOD FOR STORING, RETRIEVING AND PRESENTING OBJECTS WITH RICH LINKS

[75] Inventor: Gerald C. Seagraves, Palo Alto, Calif.

[73] Assignee: Corel Corporation Limited, Dublin, Ireland

[21] Appl. No.: 299,694

[22] Filed: Sep. 1, 1994

Related U.S. Application Data

[63] Continuation of Ser. No. 757,708, Sep. 11, 1991, abandoned.

[51] Int. Cl.$^6$ ............................................... G06F 17/30
[52] U.S. Cl. ............................................................ 395/614
[58] Field of Search ............................ 395/600, 154, 395/156, 614

[56] References Cited

U.S. PATENT DOCUMENTS

| | | | |
|---|---|---|---|
| 5,065,347 | 11/1991 | Pajak et al. | 395/159 |
| 5,089,956 | 2/1992 | MacPhail | 395/600 |
| 5,132,900 | 7/1992 | Gilchrist et al. | 364/419 |
| 5,179,718 | 1/1993 | MacPhail | 395/800 |
| 5,204,812 | 4/1993 | Kasiraj et al. | 364/419 |
| 5,204,947 | 4/1993 | Bernstein et al. | 395/157 |
| 5,226,161 | 7/1993 | Khoyi et al. | 395/650 |
| 5,241,671 | 8/1993 | Reed et al. | 395/600 |
| 5,251,294 | 10/1993 | Abelow | 395/155 |
| 5,274,758 | 12/1993 | Beitel et al. | 395/154 |
| 5,297,249 | 3/1994 | Bernstein et al. | 395/156 |
| 5,333,237 | 7/1994 | Stefanopoulos et al. | 395/12 |
| 5,341,293 | 8/1994 | Vertelney et al. | 364/419.17 |
| 5,367,621 | 11/1994 | Cohen et al. | 395/154 |
| 5,418,942 | 5/1995 | Krawchuk et al. | 395/600 |
| 5,504,921 | 4/1996 | Dev et al. | 395/800 |

*Primary Examiner*—Wayne Amsbury
*Attorney, Agent, or Firm*—Fenwick & West LLP; Lisa D. Noble

[57] ABSTRACT

A method and apparatus for managing and sub-classifying units of data (objects) through the use of codified linkages between objects and for querying and presenting such objects, their linkages, and the codified data concerning their linkages. The query and presentation method is called Query-By-Outline (QBO). The method of retrieving and displaying interrelated data stored according to class memberships, linkages between individual objects, or linkages between classes, upon identification of an object of interest, including the steps of (1) creating an inventory of related objects related to the object of interest, the inventory including information about the objects themselves as well as relationship information about their relationships to the object of interest; (2) developing an arrangement of the inventory making use of the relationship information as well as information about the related objects themselves; (3) simplifying the arrangement for presentation by intelligently grouping the inventory into groups determined at least in part by the relationship information and the information about the related objects; and (4) displaying the arrangement.

8 Claims, 13 Drawing Sheets

Codification of "Instructor" and "Husband/Wife" links:

*Prior art codification of tables:*

Persons table
---
First-Name, Last-Name, Age

Schools table
---
School-Name, Phone-Number, Type-of-School

*Prior art linking of records between two tables:*

Persons

---
John, Smith, 26
Jane, Doe, 10  ← Pupil → Coronado, 237-0241, Grade school
Janis, Smith, 19 ← Pupil → Sunnyslope, 387-4297, High school
Harvard, 231-2400, University Schools
---

Before | After
--- | ---
Jerry | Jerry
└ Garth, Brother | └ Garth, Brother
   ├ Jerry, Brother |    └ Arlene, Wife
   └ Arlene, Wife |

FIG. 6

John Doe
├ Family
├ Other persons
├ Member of
├ Other organizations
├ Animals
└ Vehicles

FIG. 7

John Doe
├ Family
│   ├ Mother, Janice Doe
│   ├ Sister, Sabrina Bloomfield
│   └ Sister, Tanya Murray
├ Other Persons
│   ├ Boss, Suzanne Zimmerman
│   └ Friend, Andy Wistrich
├ Member of
│   ├ Association for Computing Machinery
│   └ MENSA
├ Other organizations
│   ├ Director of Research, Jetson Industries, Inc.
│   ├ Former Busboy, Hard Rock Cafe
│   └ Volunteer, Greenpeace
├ Animals
│   ├ Racing horse, Lightning
│   └ Siberian Husky, Dmitri
└ Vehicles
   ├ Ferrari Testarosa
   └ Cadillac Allante

FIG. 8

```
Cadillac Allante
├─ Owners
│  ├─ John Doe
│  └─ Richard Doe
└─ Manufacturer, Cadillac Corporation
   ├─ V.P. Marketing, Tanya Murray
   ├─ Headquarters, General Motors
   │  ├─ Directors
   │  └─ Divisions
   └─ Other products
      ├─ Cadillac Eldorado
      └─ Cadillac Seville
```

FIG. 11

```
  − Richard Doe
+ ├─ Owner, Cadillac Allante
• ├─ Friend, Andy Wistrich
⚡├─ Update Richard's information
− └─ Documents
□    ├─ Letters
📁    └─ Personal
□       ├─ Latest draft of my resume, 10/28/89, RESUME.DOC
□       └─ Autobiography Chapter 3, 11/15/89, 97,316 chars
```

FIG. 12

```
4  − Richard Doe
2 + ├─ Owner, Cadillac Allante
  • ├─ Friend, Andy Wistrich
  ⚡├─ Update Richard's information
9  − └─ Documents
7 □    ├─ Letters
2 📁    └─ Personal
  □       ├─ Latest draft of my resume, 10/28/89, RESUME.DOC
  □       └─ Autobiography Chapter 3, 11/15/89, 97,316 chars
```

FIG. 13

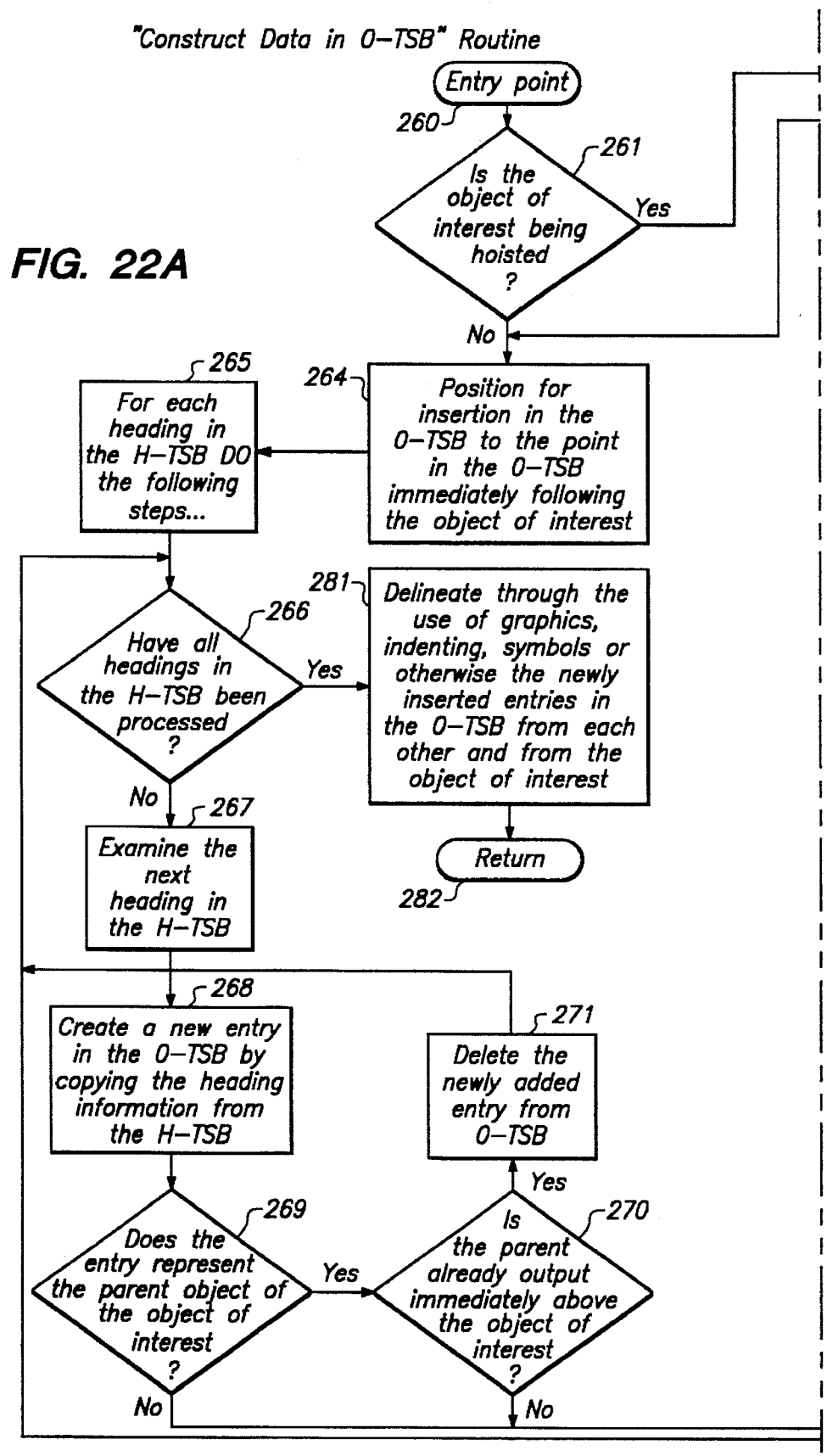

APPARATUS AND METHOD FOR STORING, RETRIEVING AND PRESENTING OBJECTS WITH RICH LINKS

This continuation of application(s) Ser. No. 07/757,708 filed on Sep. 11, 1991, now abandoned.

BACKGROUND OF THE INVENTION AND PRIOR ART

This invention relates generally to linking and querying linked data in a computer system, and more specifically to managing and sub-classifying units of data, called objects, through the use of codified linkages between objects, and a system for querying and presenting such objects, their linkages, and the linkage data so codified.

One of the most common uses for computer systems is the storage and retrieval of data. Data is often diverse in kind and granularity, such as text and graphic files, database fields, records, sets, objects, executable routines, and others. As the volume of data increases, so does the need for better methods of expressing and querying relationships within the data.

Although the prior art provides methods for sub-classifying and cross-referencing data, as well as for querying such sub-classifications and cross-references, it suffers from a number of major shortcomings. One major shortcoming of prior art systems for cross-referencing data is that they do not provide for the codification of links to allow each link classification to store a codified set of user-defined fields relevant to that classification itself. Prior art systems exist for linking multiple units of data. For example, data on Suzanne and data on her husband Jerry may be linked.

Prior art systems allow, for example, a link to be established or programmed between a specific person and a specific school. The link itself contains only the type of link ("Pupil" in this case) and some internal information such as record or object numbers, offsets or record keys to maintain the link between the subject records of the link. Two such "Pupil" links are depicted in FIG. 3.

Prior art systems suffer from a number of limitations. First, they do not provide for user-specified codification of the links themselves. They provide only for the codification of the records in the tables. This forces the user to do considerable custom programming to facilitate the storage of such link information, or suffer increased difficulties accessing and querying such link information if the information is stored free-form and not codified.

Such custom programming is an extensive task when multiple links of various types and codifications are to be provided from any number of individual records in any number of different tables, using any number of different file types and fragments in any expanse of computer store, especially when the links are many and/or contain considerable quantities of information. Prior art systems also require substantial on-going re-programming and maintenance to accommodate information pertinent to links as new link types are needed and as the nature of link information changes.

BRIEF DESCRIPTION OF THE INVENTION

The method and apparatus of the present invention allows links to be classed and codified based on their classifications, so that, in the above example of married couple Suzanne and Jerry, the link between them may contain fields of information such as wedding date, wedding place or divorce date, since the link was of the class Husband/Wife. The system of the present invention can also enable a link, such as of the classification Husband/Wife, to automatically be a member of a parent link class such as "Family" that is further codified to include fields of information pertinent to all "Family" type links.

Briefly, the method of the invention of retrieving and displaying interrelated data stored according to class memberships, linkages between individual objects, or linkages between classes, upon identification of an object of interest, includes the steps of: (1) creating an inventory of related objects related to the object of interest, the inventory including information about the objects themselves as well as relationship information about their relationships to the object of interest; (2) developing an arrangement of the inventory making use of the relationship information as well as information about the related objects themselves; (3) simplifying the arrangement for presentation by intelligently grouping the inventory into groups determined at least in part by the relationship information and the information about the related objects; and (4) displaying the arrangement.

As prior art systems do, this invention allows each link to be classified, such as "Pupil" and "Instructor". Where this invention advances the art is that it provides a significantly easier to implement and more concise way to express link information and sub-class data by allowing links to be codified and therefore to be able to store data relevant to the links themselves. The links themselves are treated as codified records with corresponding data dictionary entries or data definitions that define their codification by link type. Thus, each link type has a separate table with each record in the table storing information about one link of that link type. This arrangement will be called "rich" link information.

Modeling and managing such rich link information for more than a few objects and links is not possible with prior art systems without costly and time-consuming custom programming and/or the ineffective query methods required by the non-codified free-form storage of link information.

Prior art flat-file and relational database users are required: (1) to employ programmers to program additional tables for the link codification data; (2) to provide program logic to assign unique arbitrary identifications to every link and every object referenced by each link; and (3) to provide custom programming each time link types or their codifications are added or changed. Prior art object-oriented databases require the programming of links through similar means and through the use of the sub-classing capabilities of such databases. This invention also provides a superior method of sub-classing data where such sub-classification is, or can be expressed as, the result of linkages between objects. For example, a person named Nancy might have the properties of a person, but if she is linked to a company named ACME Sciences with a link of the link type employee, and the link is codified to contain information about her employment there, then as a result of this rich link she has been effectively sub-classed to be an employee, with all the attendant properties of being an employee stored on the employee link. Likewise, for each other link Nancy has she will be sub-classed by each link's link type and will inherit the properties codified for each such link.

At best, prior art methods only provide tools for programming the storage and "a priori" presentation of such information on a case-by-case basis, the ability for a user to outline such information, traditional filter-and-display techniques and graphical web views of links that become impractical as the number of links grows.

BRIEF DESCRIPTION OF THE DRAWINGS

FIG. 6. illustrates a before and after display produced by the invention.

FIGS. 7 through 13 illustrate other typical displays produced by the invention.

DETAILED DESCRIPTION OF THE INVENTION

Figures 1, 2, 3:
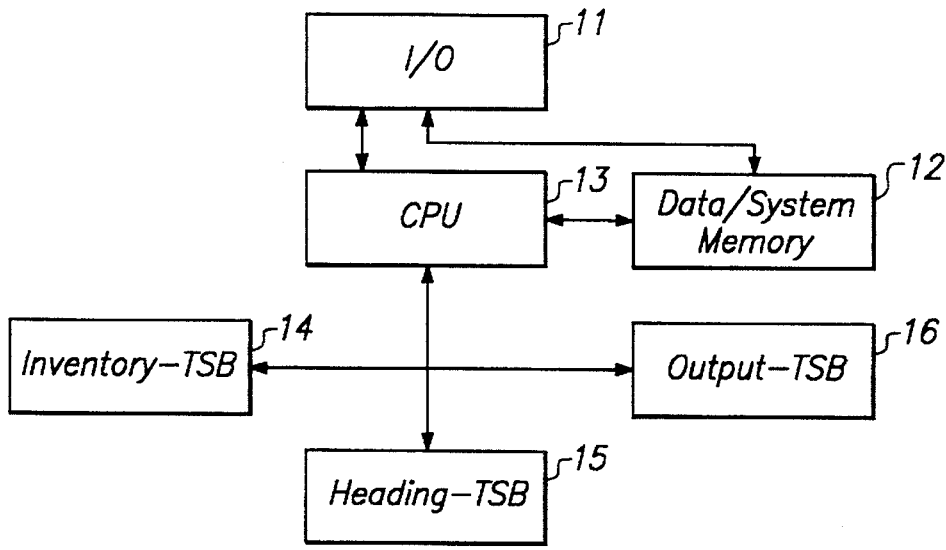
FIG. 1 is a block diagram of the apparatus of a preferred embodiment of the invention.
FIG. 2 illustrates the prior art codification of tables.
FIG. 3 illustrates the prior art linking of records between two tables.

The detailed description which follows is presented largely in terms of manipulation techniques and symbolic representations of operations on data within a computer system.

The steps used in the invention are physical manipulations of physical quantities. Usually, though not necessarily, these quantities take the form of electrical or magnetic signals capable of being stored, transferred, combined, compared and otherwise manipulated. These signals are usually called data, bits, values, elements, symbols, characters, terms, numbers, or the like. It should be kept in mind, however, that all of these and similar terms are merely convenient labels to be associated with the appropriate physical quantities.

Further, the data manipulations performed are often referred to in terms such as storing, retrieving or grouping, which are commonly associated with operations performed by a human operator. No human operations are necessary or desirable in most cases described because these operations are machine or computer operations.

The present invention also relates to the apparatus for performing these operations. This apparatus may be specifically constructed for the required purposes or it may comprise a general purpose computer as selectively activated or reconfigured by a human, machine, or computer program. The techniques presented here are not inherently related to any particular computer or other apparatus. In particular, various general purpose machines may be used, or a more specialized apparatus may be employed to perform the required method steps.

Useful computer systems for performing the method of the present invention include general purpose digital computers, such as personal computers (PCs) or other similar devices, including, for example, the IBM and IBM-compatible PCs and the Macintosh family of PCs.

Well-known apparatus designs, structures and methods are not described in detail. It is assumed one skilled in the art desiring to practice this invention can select or configure a computer system that will perform the method of the invention as described herein.

This description of the preferred embodiment uses the following terms:

User: A human, machine, software, or other entity that is using this invention.

Object: Any unit of data or information inside or outside of the system in which this invention is implemented, or any information that identifies other information or other entity inside or outside of the system in which this invention is implemented. For example, text, spreadsheet, graphic files, images or fragments thereof, database fields, records, sets, objects, executable routines or any other kind of data or entity identified or accessible by some means, whether it exists inside or outside the environment in which this invention is practiced.

Class: Any set that may have as members one or more objects.

Sub-class: Any set whose members are automatically made members of one or more parent classes as a result of their membership in the sub-class.

Parent class: Any set where one or more members' membership may be the result of automatic membership in the set because such members are members of one or more sub-class sets of the parent class.

Sub-classing: The process of specifying sub-class and parent class properties and membership rules.

Object class: Any class whose members are objects.

Linkage class: Any class whose members are links.

Supergroup: Any group of objects that is a grouping of two or more already-grouped groups of objects. For example, a group of Sisters would be grouped together with a group of Brothers into a supergroup called Family if Sisters and Brothers were sub-classes of Family.

Hoisting: The process whereby the user requests the object of interest be made the focal point of the query, causing all information related to the object of interest to be organized from the perspective of the object of interest, whether that information were previously presented at all, above, below, or in any other relationship with respect to the object of interest.

There follow some examples of the use of the above terms.

An object parent class of "Place" might include object sub-classes such as "Hotel", "Church" and "Restaurant". While "Restaurant" is an object sub-class of "Place", it also may be an object parent class of the object sub-classes "Pizza parlor" and "Care". A particular object, such as "Hard Rock Cafe at 1234 Main Street" might be a member of the object sub-class "Cafe", making it automatically also a member of the object parent class "Restaurant" and, in turn, the object parent class of "Restaurant"—"Place".

Continuing the example, another object such as "Jill Jones" might be a member of the object sub-class "U.S. Citizen" and so automatically also be a member of the object parent class of "U.S. Citizen"—"Person". Jill may be linked to the Hard Rock Cafe as its "Manager". She therefore would be a member of the linkage sub-class "Manager" and automatically also a member of the "Manager's" linkage parent class "White collar worker", and also the linkage parent class of "White collar worker"—"Employee". The linkage of "Manager" might be codified to include years of management experience and the date of last management certification, and so forth. The linkage of "White collar worker" might be codified to include information about the company-provided vehicle, while the linkage of "Employee" might contain such information as the date hired, date terminated, reason for leaving, graphic image of the employee's employment application, and so forth.

While the displayed output of the method of the invention might at first show all of the above example information from the perspective of the object "Hard Rock Cafe at 1234 Main Street", the user might designate object "Jill Jones" as the object of interest and request that she be "hoisted" as the focus of the output. The output would automatically be reorganized through application of the rules which will be disclosed herein, causing "Jill Jones" to become the focus of said output.

If a group of Sisters and a group of Brothers were both sub-classes of Family, then the two groups (Sisters and Brothers) might be combined into a supergroup called Family, which would be the parent class.

The following detailed description of the method of the invention is divided into several sections. The first section discloses the system for implementing codified links. Later sections describe the techniques for querying and displaying these links along with their codified information.

Referring to FIG. 1, the apparatus of the invention includes input/output (I/O) means 11, data/system memory 12, central processing unit (CPU) 13, temporary storage memory buffers inventory-TSB 14, heading-TSB 15 and output-TSB 16. The I/O 11 consists of circuitry, software, and peripherals including video display, keyboard, disk drive, communications, printer and networking interface hardware. The system also includes software. The data/system memory 12 and temporary storage memory buffers 14, 15 and 16 are usually storage areas within one or more semiconductor memories, such as random access memory (RAM).

Because the computers that may be used in practicing the invention consist of many diverse elements and devices, no detailed program listings have been provided. It is considered that the operations, flow charts and other procedures described herein and illustrated in the accompanying drawings are sufficient to permit one of ordinary skill in the art to practice the invention.

Management of Rich Links

Many computer programs allow for the linking of information. Relational databases allow records in one table to link to records in another table. Hypertext programs allow words, phrases, or graphics to be linked to other words, phrases, or graphics. Word processing programs allow footnotes to be linked to body text. Object oriented databases allow objects and classes to be linked to other objects or classes. All of these technologies provide links that contain the information needed to classify and maintain the linkages.

The system of the present invention differs in that when two or more objects are linked, the link is not only classified but it is codified to include user-defined fields of information pertinent to that classification. This codification of links allows them to represent all of the information concerning the relationships represented by each classification of link and effectively to provide for the sub-classification of the objects that are the respective subjects of the links, which is a new and unique method for sub-classing objects.

For example, under some prior art systems there may, for example, be a record in a "Persons" table (representing a particular person) and a record in a "Schools" table (representing a particular school) and a desire to link a specific person in the "Persons" table to a specific school in the "Schools" table. The "Persons" and "Schools" tables are typically codified to include various user-defined fields to be tracked for each record in those tables. An example of the information used in the codification of such "Persons" and "Schools" tables is depicted in FIG. 2.

Figure 4:
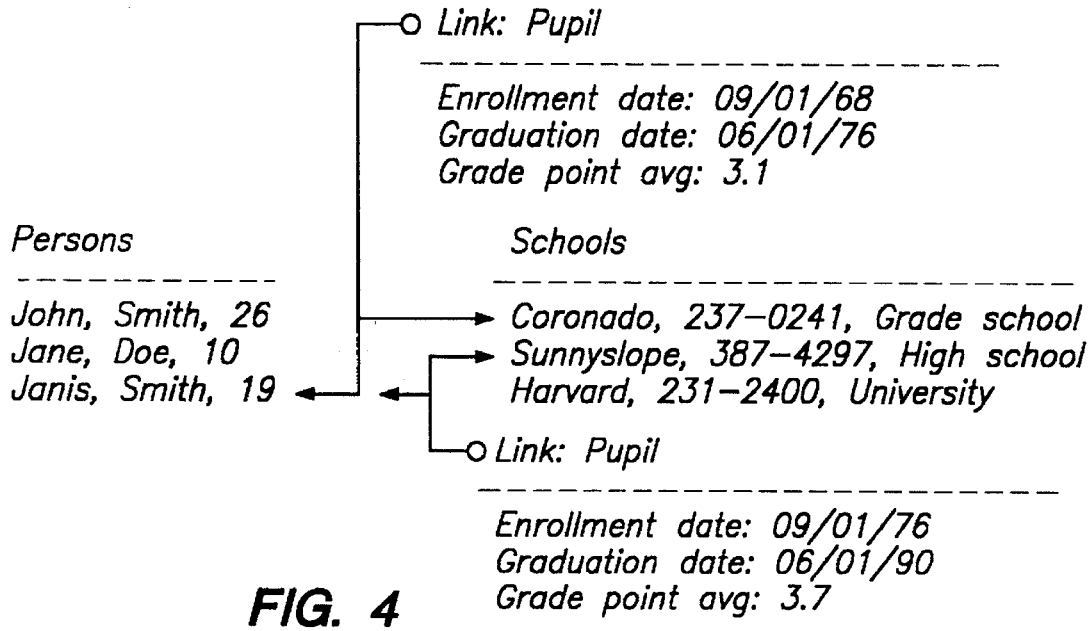
FIG. 4 illustrates the codification of the invention of "Pupil" links between records in two tables.

FIG. 4 illustrates how this invention codifies links to include relevant information about each link. New link types and their codifications can be added and changed interactively by non-technical computer operators, machines, or software allowing the expression of an evolving network of rich link relationships without the need for special computer programming. In FIG. 4 the "Pupil" type link between the Person record for Janis Smith in the Persons table and the School record for Coronado Grade school in the Schools table is codified to include her enrollment date, graduation date and grade point average. Her Pupil type link to Sunnyslope high school is similarly codified. These two Pupil type links and all other Pupil type links are stored in a link record table for the link type of pupil. Each link record in the Pupil link table is codified to include the information pertinent to Pupil links in the same manner as each record in the Persons table is codified to include information pertinent to each Person record. Thus, just as prior art codified tables accommodate the storage of codified fields of information for object records, this invention's link record tables accommodate the storage of codified fields of information for the link records.

Figure 5:
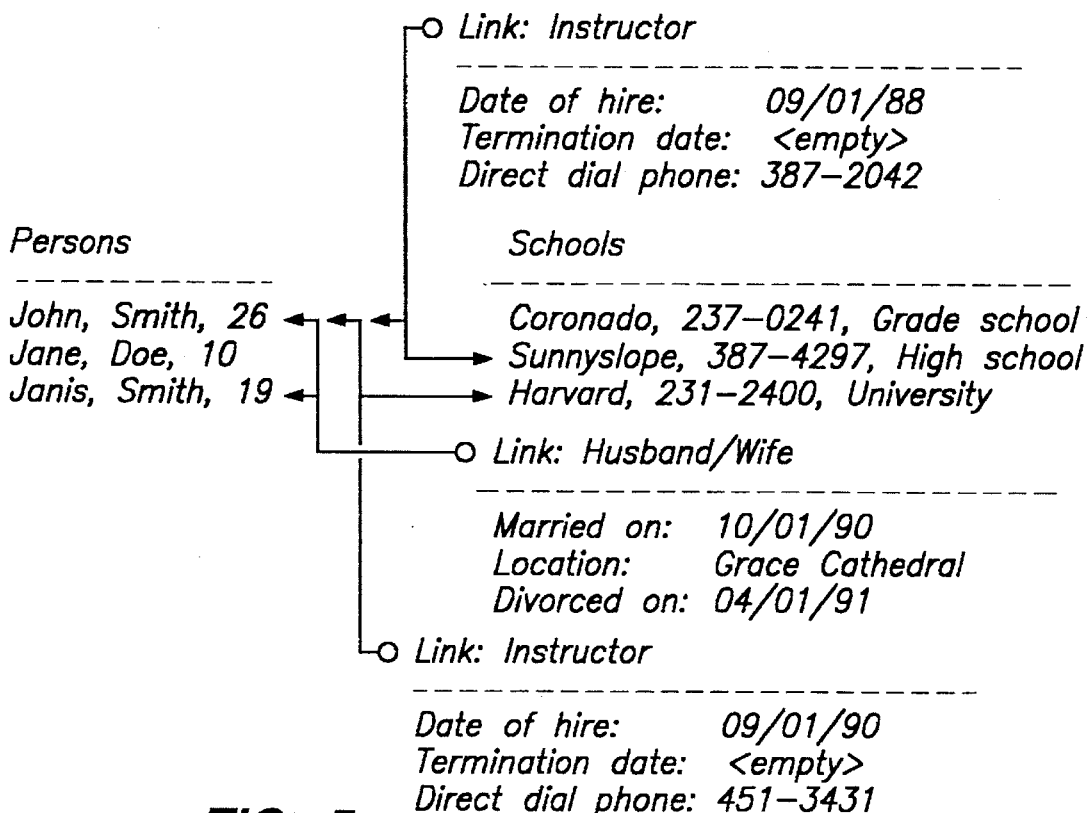
FIG. 5 illustrates the codification of the invention of "Instructor" and "Husband/Wife" links.

FIG. 5 depicts how this invention facilitates codified links between any objects regardless of type. An object may have none, one, or many links to another object or to many other objects. These form a network, or web, of links from any object to any other object. Codified links also facilitate the expression of other information about relationships, including temporal information, such as the time of their commencement and expiration. In FIG. 5 the short marriage between John, an instructor at Sunnyslope, and Janis, a pupil there, is shown in the Husband/Wife link table. They were married at Grace Cathedral on Oct. 1, 1990, four months after Janis graduated (as shown in FIG. 4 in the Pupil link table), but divorced in six months.

FIG. 5 also illustrates that John Smith is a member of the "Person" object class since his record is in the "Persons" table. He is linked to Sunnyslope High School by a link that is of the class "Instructor". This link enrolls him as a member of the linkage class "Instructor", which gives him the additional properties of "Date of hire", "Termination date" and "Direct dial phone", which are codified fields associated with and stored on that link. Notice that John, a person, has been effectively sub-classed as an instructor in two instances, and a husband in one instance by his respective links to the two schools Sunnyslope and Harvard, and to his wife Janis, while each link stores the appropriate additional properties for each sub-classification of John.

Multiple instances of like link types and their corresponding sub-class memberships are automatically handled by this invention since each link exists separately and stores the data relevant to that link. Therefore, since John teaches at two schools, Sunnyslope and Harvard, each of these two Instructor links contains his date of hire, termination date and direct dial phone number relevant to John's employment at that particular school.

These codified links are superior to the links provided in prior art hypertext systems since their codification facilitates the storage of user-defined fields of information pertinent to each link. They are also superior in many situations to the object sub-classing schemes employed by prior art object-oriented databases where such sub-classification is, or can be expressed as, the result of linkages between objects. The codified links of this invention are able to more easily and more concisely map to the human understanding and expression of interrelated information and can be established and maintained by non-technical computer operators, machines, or software without custom computer programming.

Query-By-Outline

The following sections disclose the feature of the invention that makes use of the links, codified links, object sub-classing and link sub-classing of the invention to provide a query method called Query-By-Outline (QBO). These sections will reference the flow charts provided in FIGS. 14 through 22.

Designation of the Object of Interest

Figure 14:
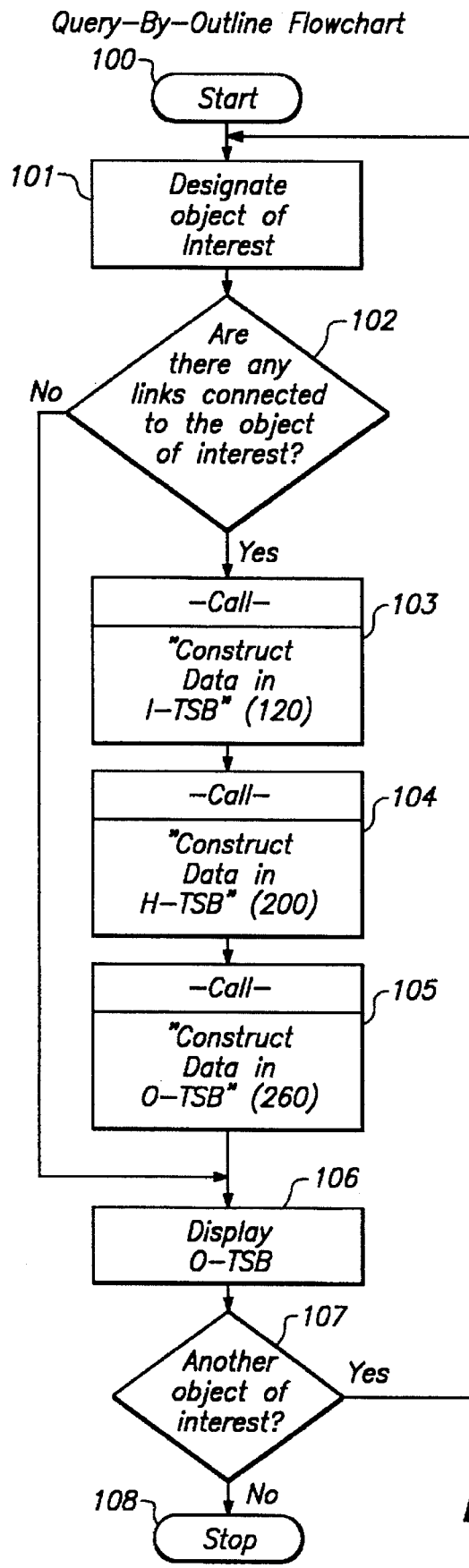
FIGS. 14 through 22 are flow charts of the Query-By-Outline technique of this invention.

Referring to FIG. 14, after the initial "start" step 100, the "user" of the invention, whether human, machine, software or otherwise designates the object of interest and communicates the designation to the system in step 101. For example, a computer operator might actuate a keyboard, mouse, glove, pen, touch-screen, microphone or other input device to cause a cursor, graphic, or highlighted region on a computer display to be oriented so as to designate an object of interest. The machine or software communicates using inter-process communication or other means to enter the designation.

Once the object of interest has been designated, a test is made in step 102 to determine if there are any links connected to the object of interest. If there are none, step 106 is the next step taken after step 102 and the Output Temporary Storage Buffer (O-TSB) 16 is displayed. If step 102 instead determines that there are any links connected to the object of interest, then step 103 is the next step after step 102.

Step 103 performs a call to the routine identified by both its name and beginning step number, "Construct Data in I-TSB" and step 120 respectively.

The following sections refer to the process whereby a step calls a routine. When a step calls a routine:

1. The text "-Call-" is shown in the upper rectangle of the calling step, such as step 103 in FIG. 14.

2. The name of the routine being called is shown enclosed in double quotes in the lower rectangle of the calling step.

3. The step number of the routine being called is shown enclosed in parenthesis in the lower rectangle of the calling step. This is the first step of the called routine and is known as the "Entry point".

4. The last step of the called routine is known as the "Return" which is the step at which the called routine ends. When the called routine ends, program control returns back to the next step after the step that called the routine.

Thus, step 103 shows the text "-Call-" in the upper rectangle indicating that it is calling a routine. The routine name "Construct Data in I-TSB" being called is shown in the lower rectangle of step 103, along with the number of the first step of the routine being called, step 120.

Figure 15:
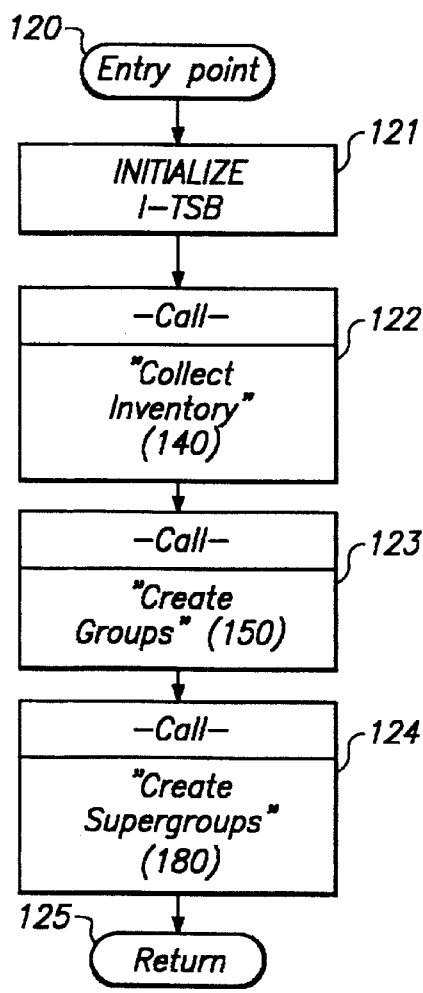

So, if there are any links connected to the object of interest, step 102 directs program control to step 103, which calls the routine named "Construct Data in I-TSB", causing step 120 shown in FIG. 15 to be executed. Step 120 is the entry point of the "Construct Data in I-TSB" routine of FIG. 15 and directs control to step 121.

Flow Chart for Constructing Data in Inventory-TSB 14

This flow chart is shown in FIG. 15. All of the flow charts to be described hereafter also refer to the apparatus of FIG. 1.

1. Step 121: Initialize Inventory-TSB (I-TSB) 14 shown in FIG. 1.

Figure 16:
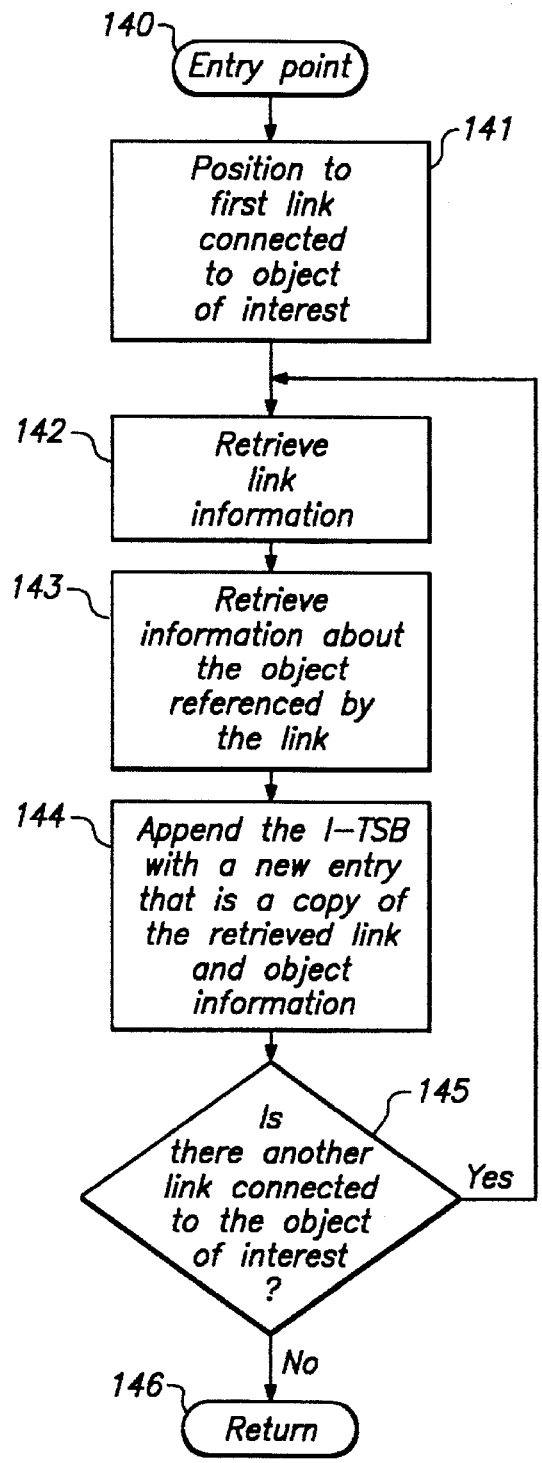

2. Step 122: Collect an inventory of information about all objects related to the object of interest and store that inventory into I-TSB 14. Specifically:

a. Step 122 calls step 140 in FIG. 16, the "Entry point" step of the "Collect Inventory" routine shown in FIG. 16.

b. Referring to FIG. 16, step 141 positions to the first link connected to the object of interest.

c. Step 142 retrieves the link information of the link connected to the object of interest.

d. Step 143 retrieves the information about the object referenced by the link.

e. Step 144 appends I-TSB 14 with a new entry that is a copy of the retrieved link and object information.

f. Step 145 determines if there is another link connected to the object of interest.

g. If step 145 determines that there is another link connected to the object of interest, then program control is looped back to step 142 and that link's link information is retrieved and the process is repeated for each link connected to the object of interest.

h. When step 145 determines that there are no more links connected to the object of interest, then program control is directed to step 146, the "Return" step of the "Collect Inventory" routine, causing program control to be directed to the next step after the step that called the routine, which was, in this example, step 123 in FIG. 15.

3. Referring to FIG. 15, in step 123, the inventory of information collected about all objects related to the object of interest and stored in I-TSB 14 is organized as follows:

a. Create groups of objects having like linkage sub-classes to the object of interest for each like linkage sub-class. Two or more objects must qualify in order to create these groups. For example, if two objects were each linked as "Daughter" to the object of interest, then these two objects are grouped together into one group for the linkage sub-class of "Daughter".

b. Create groups of objects having like linkage parent classes to the object of interest for each like linkage parent class. Two or more objects must qualify in order to create these groups. For example, if one object is linked as "Sister" to the object of interest and another object is linked as "Brother", and, furthermore, "Sister" and "Brother" were linkage sub-classes belonging to the linkage parent class "Family", then these two objects are grouped together into one group based on the linkage parent class of "Family".

c. For the remaining objects linked to the object of interest that have not been grouped, create groups of objects belonging to like object sub-classes for each like object sub-class. Two or more objects must qualify in order to create these groups. For example, if the object of interest are linked to two objects that are both members of the object sub-class "Hotel", then these two objects will be grouped together into one group.

d. Create groups of objects belonging to like object parent classes for each like object parent class. Two or more objects must qualify in order to create these groups. For example, if the object of interest is linked to one object that is a member of the object sub-class "Church" and to one object that is a member of the object sub-class "Health club", and where "Church" and "Health club" are sub-classes belonging to the object parent class "Place", then these two objects will be grouped together into one group based on the parent class "Place".

e. The remaining objects linked to the object of interest that have not been grouped by the above grouping methods remain as individual objects in I-TSB 14.

Figure 17:
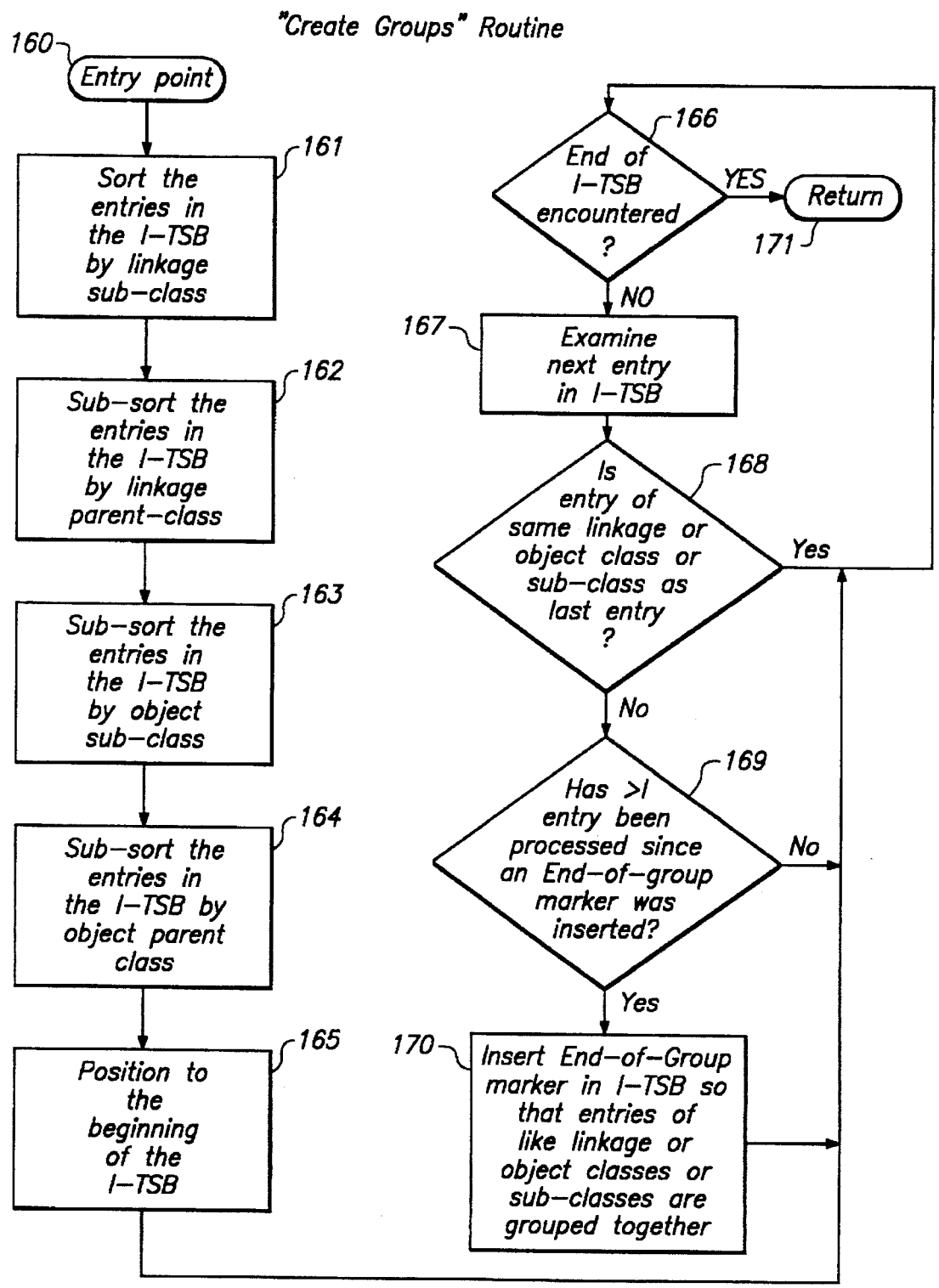

Specifically, step 123 calls step 160 in FIG. 17, the "Entry point" step of the routine named "Create Groups" shown in FIG. 17.

Step 161 sorts the entries in I-TSB 14 by linkage sub-class.

Step 162 sub-sorts (that is, sorts the entries without disturbing any previous sort or sub-sort of the entries) the entries in I-TSB 14 by linkage parent class.

Step 163 sub-sorts the entries in I-TSB 14 by object sub-class.

Step 164 sub-sorts the entries in I-TSB 14 by object parent class.

Step 165 positions to the beginning of I-TSB 14 (the first entry in I-TSB 14).

Step 166 determines if the end of I-TSB 14 has been encountered (that all of the entries in I-TSB 14 have been processed).

If step 166 determines that the end of the I-TSB 14 has not been encountered, then step 167 is taken.

Step 167 examines the next entry in the I-TSB 14.

Step 168 uses the examination information from step 167 and determines whether the entry is of the same linkage or object class or sub-class as the last examined entry-that is, is the entry of the same linkage class, of the same object class, of the same linkage sub-class or of the same object sub-class as the last examined entry? If the entry is of the same linkage or object class or sub-class as the last examined entry, then program control is looped back to step 166 and the process is repeated until all entries in I-TSB 14 have been processed. If the entry is not of the same linkage or object class or sub-class as the last examined entry, then program control proceeds to step 169.

Step 169 determines whether more than one entry has been processed since an "End-of-group" marker entry was inserted into I-TSB 14. If not, step 169 loops program control back to step 166 and the process is repeated until all entries in the I-TSB 14 have been processed. If step 169 instead determines that more than one entry has been processed since an "End-of-group" marker was inserted into I-TSB 14, then program control proceeds to step 170.

Step 170 inserts an "End-of-group" marker entry in I-TSB 14 so that entries of like linkage or object classes or sub-classes are grouped together by such group markers in the. I-TSB 14. Then program control is looped back to step 166 and the process is repeated until all entries in I-TSB 14 have been processed.

When step 166 determines that the end of I-TSB 14 has been encountered (that is, all entries in I-TSB 14 have been processed), program control is directed to step 171, the "Return" step for the "Create Groups" routine of FIG. 17, which directs program control to the next step after the step that called the "Create Groups" routine, step 124 in FIG. 15.

4. The inventory of information collected about all objects related to the object of interest and stored in I-TSB 14 is organized by step 124 in FIG. 15 by creating sub-groups of objects that are members of sub-classes that, in turn, are members of like parent classes, to form supergroups. For example, a group of Sisters, a sub-class of Family, will be grouped together with a group of Brothers, also a sub-class of Family, into a supergroup called Family, the like parent class, so that the supergroup Family will contain the two groups Sisters and Brothers.

Figure 18:
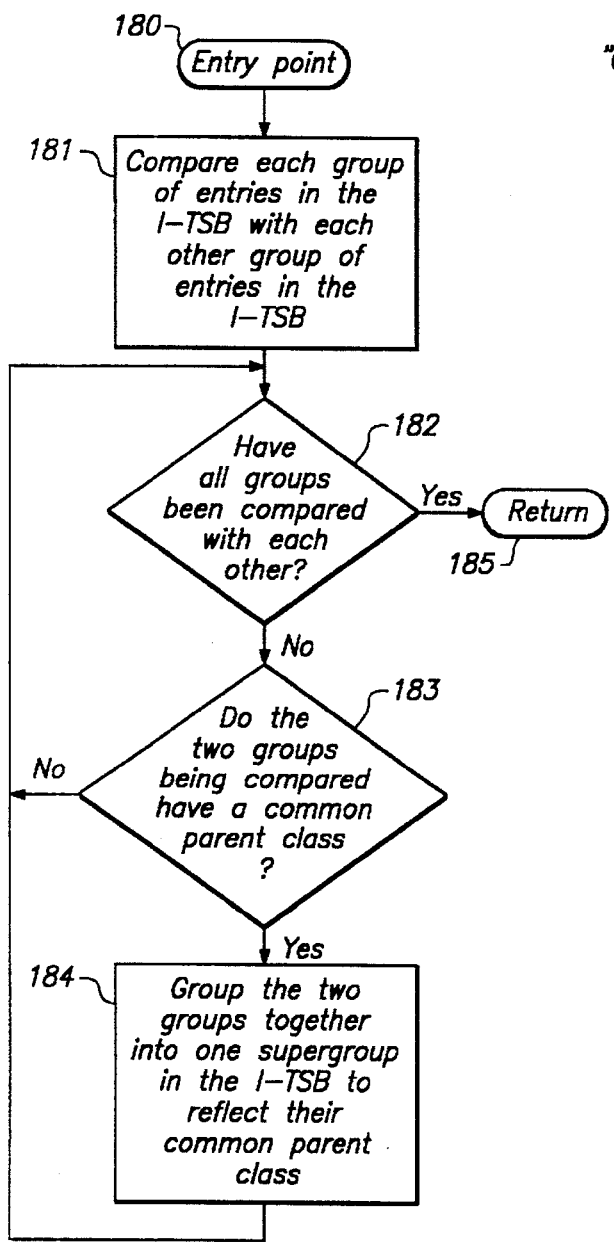

Specifically step 124 in FIG. 15 calls step 180 in FIG. 18, the "Entry point" of the routine in FIG. 18 named "Create Supergroups" Step 181 compares each group of entries in I-TSB 14 with each other group of entries in I-TSB 14. Step 182 determines when all groups in I-TSB 14 have been compared with each other. If step 182 determines that not all of the groups in I-TSB 14 have been compared with each other, then step 183 is taken.

Step 183 determines whether the two groups being compared have a common parent class. If they do not, then program control is looped back to step 182 and the process is repeated until all groups in I-TSB 14 have been compared with each other. If step 183 determines that the two groups being compared have a common parent class, then step 184 is carried out. Step 184 groups the two groups together into one supergroup in I-TSB 14 to reflect their common parent class, and then loops program control back to step 182 and the process is repeated until all groups in I-TSB 14 have been compared with each other.

When step 182 determines that all groups in I-TSB 14 have been compared with each other, program control is directed to step 185, the "Return" step of the "Create Supergroups" routine, which causes program control to proceed to the next step after the step that called the "Create Supergroups" routine, which is step 125 in FIG. 15, the "Return" step of the "Construct Data in I-TSB" routine, which causes program control to proceed to the next step after the step that called the "Construct Data in I-TSB" routine, step 104 in FIG. 14.

Figure 19:
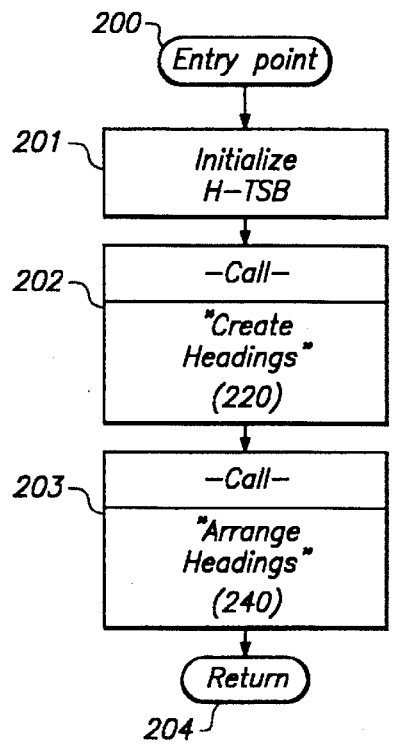

Flow Chart for Constructing the Data in Heading-TSB (FIG. 19)

1. Step 104 in FIG. 14 calls step 200 in FIG. 19, the "Entry point" step for the "Construct Data in H-TSB" routine of FIG. 19. Step 201 initializes Heading-TSB (H-TSB) 15.

2. Step 202 creates an inventory of headings in H-TSB 15 by first calling step 220 in FIG. 20, the "Entry point" step for the "Create Headings" routine. Step 221 in FIG. 20 positions to the beginning of I-TSB 14. Step 222 determines whether the end of I-TSB 14 has been encountered (that is, whether all the entries in I-TSB 14 have been processed by the "Create Headings" routine). If the end of I-TSB 14 has not been encountered, step 223 examines the next entry in I-TSB 14. Step 224 determines whether the entry examined in step 223 is a group or Supergroup marker. If it is, step 225 inserts a heading in H-TSB 15 representing the group encountered in I-TSB 14, and loops program control back to step 222 and the process is repeated until all entries in I-TSB 14 have been processed.

If the entry examined in step 223 is not a group or Supergroup, then step 226 determines whether the entry examined in step 223 is a single ungrouped entry. If it is, step 227 inserts a heading in H-TSB 15 representing the single ungrouped entry in I-TSB 14, and loops program control back to step 222 and the process is repeated until all entries in I-TSB 14 have been processed. If step 226 determines that the entry examined in step 223 is not a single ungrouped entry, then program control loops back to step 222 and the process is repeated until all entries in I-TSB 14 have been processed.

Figure 20:
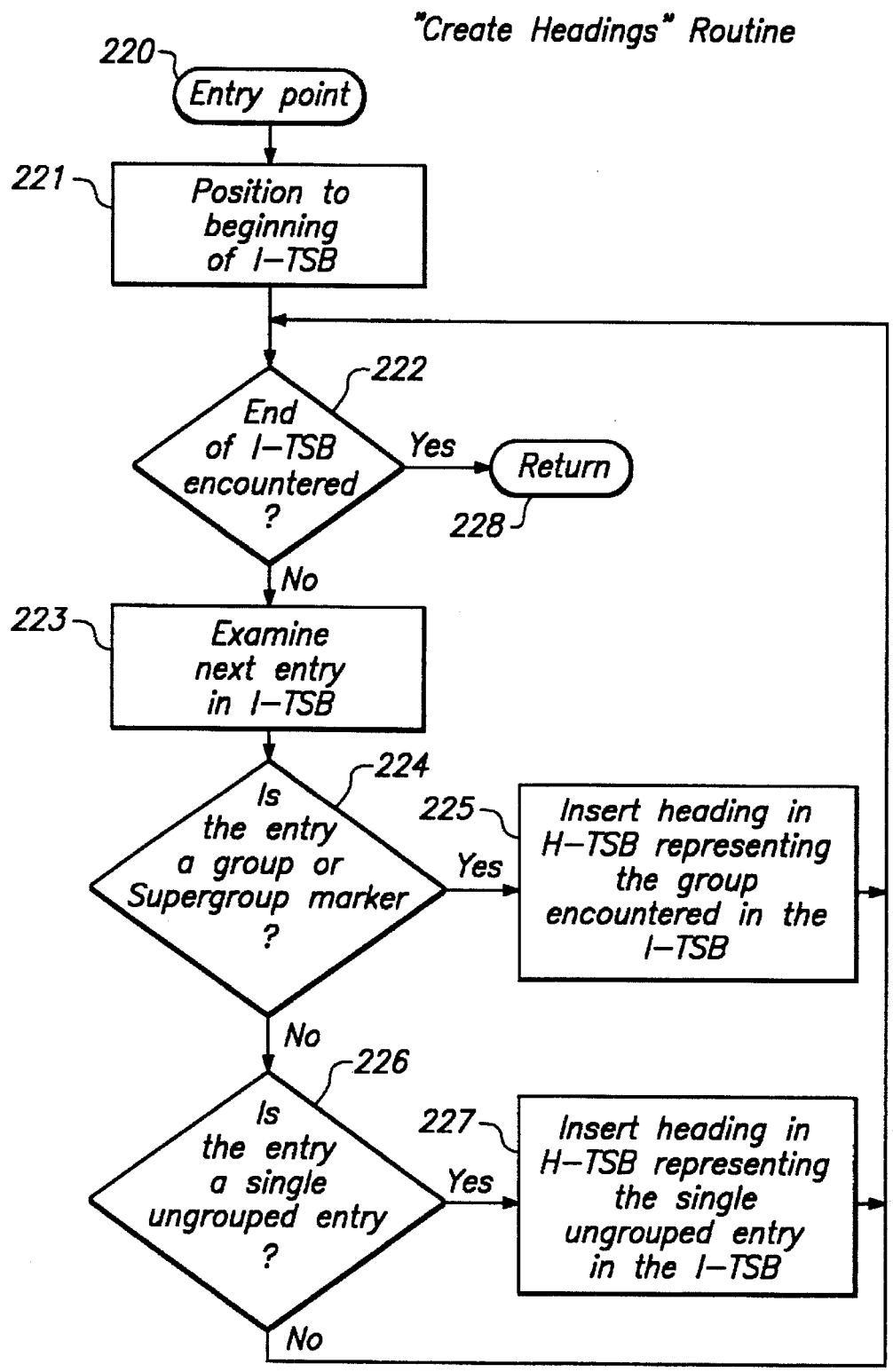

When step 222 determines that the end of I-TSB 14 has been encountered (that is, all the entries in I-TSB 14 have been processed by the "Create Headings" routine) then program control is directed to step 228, the "Return" step of the "Create Headings" routine of FIG. 20, which directs program control to the next step after the step that called the "Create Headings" routine, step 203 in FIG. 19.

Figure 21:
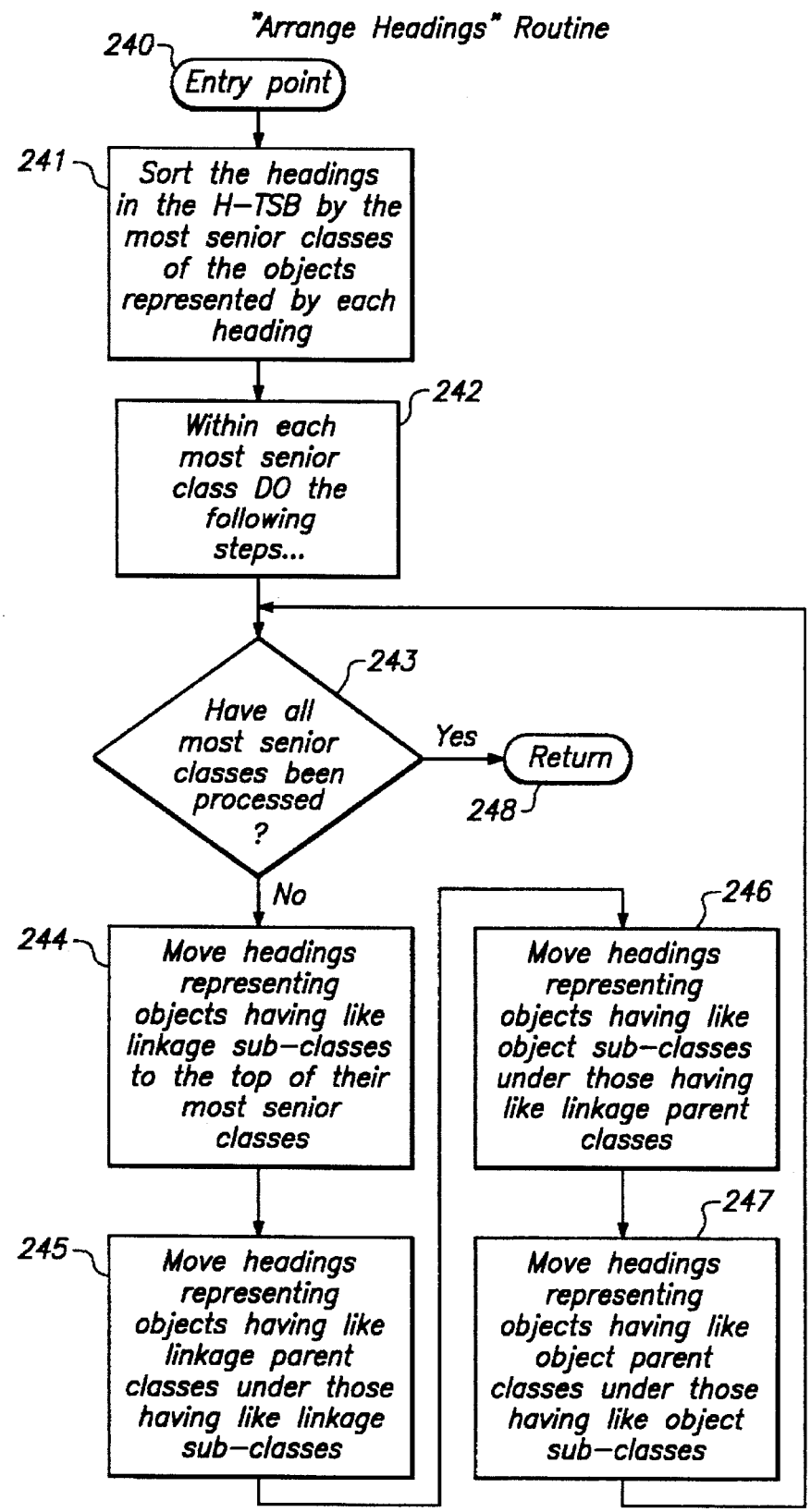

3. Step 203 organizes the inventory of headings in H-TSB 15 created by step 202 into a hierarchical inventory of headings in H-TSB 15. Specifically, step 203 calls step 240 in FIG. 21, the "Entry point" step of the "Arrange Headings" routine of FIG. 21. Steps 240–248 summarize the inventory of headings in H-TSB 15 about all objects related to the object of interest by creating one heading in H-TSB 15 for each group of objects in I-TSB 14 and one heading in H-TSB 15 for each individual object in I-TSB 14 not gathered into a group. Referring to FIG. 21, the headings in H-TSB 15 are organized as follows:

a. Step 241: Sort the headings in H-TSB 15 by the most senior classes of the objects represented by each heading. For example, in a collection of data organized with the three most senior parent classes of "Person", "Place", and "Thing", the headings whose objects belong to the "Person" class or any sub-class of "Person" are arranged together in H-TSB 15; headings whose objects belong to the "Place" class or any sub-class of "Place" are arranged together in H-TSB 15; the remaining "Thing" headings are arranged together in H-TSB 15.

b. Step 242: Within each of the most senior classes (Persons, Places, and Things in this example), place the headings in the following order:

(1) Step 244: Headings that represent objects having like linkage sub-classes to the object of interest (e.g., "Sister", where "Sister" is a linkage sub-class belonging to a linkage parent class such as "Family");

(2) Step 245: Headings that represent objects having like linkage parent classes to the object of interest (e.g., "Family");

(3) Step 246: Headings that represent objects belonging to like object sub-classes (e.g., "Hotel", where "Hotel" is an object sub-class belonging to an object parent class such as "Place");

(4) Step 247: Headings that represent objects belonging to like object parent classes (e.g., "Places").

c. Step 243: Once all most senior classes have been processed, program control is directed to step 248, the "Return" step of the "Arrange Headings" routine of FIG. 21, which directs program control to the next step after the step that called the "Arrange Headings" routine, step 204 in FIG. 19, the "Return" step of the "Construct Data in H-TSB" routine of FIG. 19, which in turn directs program control to the next step after the step (104) that called the "Construct Data in H-TSB" routine of FIG. 19, which is step 105 in FIG. 14.

Figure 22B:
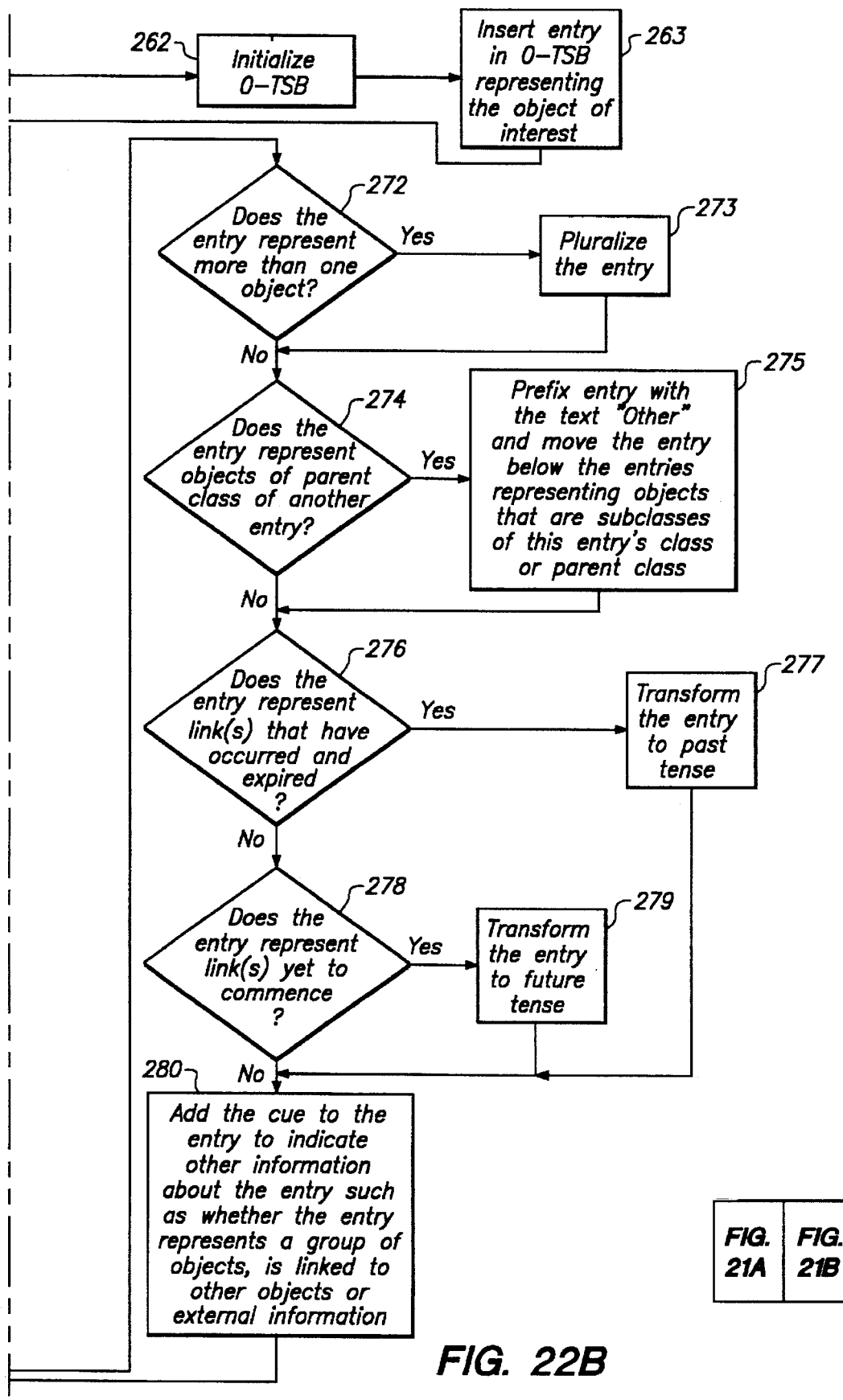

Flow Chart for Constructing the Data in Output-TSB (FIG. 22)

1. Step 105 in FIG. 14 calls step 260 in FIG. 22, the "Entry point" step of the "Construct Data in O-TSB" routine of FIG. 22.

2. Step 261 in FIG. 22 determines whether the user has requested that the object of interest be hoisted. If the object of interest is being hoisted, then step 262 initializes the Output Temporary Storage Buffer (O-TSB) 16 and step 263 inserts an entry in O-TSB 16 representing the object of interest.

3. Step 264 positions for insertion in O-TSB 16 to the point in O-TSB 16 immediately following the object of interest.

4. Steps 265–268, for each heading in H-TSB 15, insert an entry describing such heading into O-TSB 16 in the order that the headings occur in H-TSB 15.

5. Steps 269–271, if the current object of interest in O-TSB 16 is represented as being immediately subordinate to a prior object of interest (the parent entry) and such parent entry is still present in O-TSB 16, remove the newly inserted entry in O-TSB 16 that represents such parent entry to prevent it from being represented as both the immediate parent and the immediate subordinate of the current object of interest. For example, if a prior object of interest were an entry representing Jerry, and the current object of interest were an entry representing Jerry's brother Garth, and Jerry were still present in O-TSB 16 and present in such a way as to show Garth as an immediately subordinate object to Jerry (his brother), then the entry for Jerry that is naturally created and inserted as a subordinate entry under Garth is deleted to prevent replication of entries unless they are separated by more than one level of subordinance.

FIG. 6 shows an example of the output of O-TSB 16 before and after the deletion of the subordinate entry of Jerry under Garth. In the "before" illustration in FIG. 6, Jerry is both the immediate parent object of Garth (shown immediately above Garth) and also an immediate subordinate of Garth (shown directly below Garth). Because Jerry is both the immediate parent of and an immediate subordinate to Garth, the representation of Jerry as an immediate subordinate to Garth is deleted from the O-TSB 16 and from the output of O-TSB 16. Steps 269–271 do this because Jerry's relationship to Garth has already been made obvious to the user by his appearance as the immediate parent of Garth, and such removal is considered to enhance the clarity of the output.

6. Steps 272 and 273 pluralize each entry in O-TSB 16 that represents a group of more than one object (for non-textual or non-English language implementations, modify the entry with the appropriate symbols, graphics or sounds to cause the same effect). For example, an entry of "Hotel" is transformed to "Hotels" This transformation is done by rules that are incorporated into the software and/or taught or overridden by humans, machines or other software during the course of operation of the software.

7. Steps 274–575 are used for each entry in O-TSB 16 that represents one or more objects belonging to like parent classes, and where at least one entry exists in O-TSB 16 representing one or more objects belonging to a sub-class of the parent class. Each such entry that describes objects belonging to the parent class is prefixed with the phrase "Other" (for non-textual or non-English language implementations, the heading is modified with the appropriate symbols, graphics or sounds to cause the same effect), and finally, the "Other . . ." entries are repositioned so they are presented below or subordinate to the sub-class entry or entries.

For example, if an entry representing one or more objects belonging to the object sub-class of "Hotels" already exists in O-TSB 16, and another entry existing in O-TSB 16 represents one or more objects belonging to the object parent class of "Places" (the parent class of "Hotels"), then the entry "Places" is transformed to "Other places". This transformation is done by rules incorporated in the software or learned by or programmed into the software and/or were taught or overridden by humans, machines or other software during the course of operation of the software, and the entry "Other places" is positioned below or subordinate to the entry "Hotels".

8. Steps 276 and 277 transform to the past tense each entry in the O-TSB 16 that represents one or more objects whose linkage to the object of interest has expired based on the temporal information about the linkage, or whose linkage represents a discrete event that has occurred at some prior time (for non-textual or non-English language implementations, modify the heading with the appropriate symbols, graphics or sounds to cause the same effect). For example, an entry of "Works at" would be transformed to "Worked at". This transformation is done by rules incorporated into the software or learned by the software by the operation of the software and/or were taught or overridden by humans, machines or other software during the course of operation of the software.

9. Steps 278–279 transform to future tense each entry in O-TSB 16 that represents one or more objects whose linkage to the object of interest has yet to commence based upon the temporal information about the linkage, or whose linkage represents a discrete event that is to occur at some future point in time (for non-textual or non-English language implementations, modify the heading with the appropriate symbols, graphics or sounds to cause the same effect). For example, an entry of "Works at" is transformed to "Will work at". This transformation is done by rules incorporated into the software or that were learned by the software by way of operation of the software and/or taught or overridden by humans, machines or other software during the course of operation of the software.

10. Step 280 modifies each entry in O-TSB 16 with a cue, symbol, graphic, or other delineation that indicates whether that entry (1) represents a collection of objects, (2) represents an object that is linked to another object or objects, (3) represents an object that is an atomic entry (one that has either no links or has only one link and that link is to an object already displayed in the output as its immediate parent), (4) that does not represent a collection of objects and is not linked to any other object or objects, (5) represents an object outside the domain or environment of the system in which this invention is implemented, (6) represents an action or executable software procedure that will occur if the entry is activated, (7) represents a quantity of information about the entry or its links, or (8) represents other information about the entry, such modification providing a cue about such information to the human, machine or software.

11. When step 266 determines that all headings in H-TSB 15 have been processed, program control is directed to step 281. Step 281 delineates, through the use of graphics, indenting, symbols, sounds or otherwise, the newly inserted entries in O-TSB 16 from each other and from the object of interest. Step 281 directs program control to step 282, the "Return" step of the "Construct Data in O-TSB" routine of FIG. 22, which directs program control to the next step after the step that called the "Construct Data in O-TSB" routine, step 106 in FIG. 14.

Display Step 106 of FIG. 14 represents the contents of O-TSB 16 by displaying, printing, transferring, communicating or otherwise outputting them for a user, machine, or software to use. The user may request and receive additional information about any of the entries in O-TSB 16, including any objects that such entry represents, any linkages that such entry represents or any other information stored or otherwise available about such entry, objects or linkages. The user, machine, or software can also create, change, delete, or manipulate information about any of the entries in O-TSB 16, including any objects such entry represents, any linkages such entry represents or any other information stored or otherwise available about such entry, objects or linkages. The additional information may be delineated through the use of graphics, indenting, symbols, sounds or otherwise. Step 107 determines whether the user, machine or software wishes to identify another object of interest, causing the entire process heretofore described to begin again on the newly identified object of interest.

The system of the present invention analyzes an arbitrarily complex network of codified links and reduces it to an outline so that the user is presented with a shorter list of more general path selections from which to query, bifurcate, explore or manipulate.

EXAMPLE

John Doe may be related to female persons who are his sisters, his mother, his boss; and male persons who are his father, his brother, and his friend; and two organizations of which he is a member, another at which he works, another at which he used to work, another at which he volunteers; and two vehicles and two animals which he owns. The method and apparatus of the invention creates an outline shown in FIG. 7 where the user has identified John Doe as the object of interest. The headings under John Doe correspond to the entries in the O-TSB 16. Each heading represents a collection of objects grouped together by the QBO technique of this invention.

Referring to FIG. 8, even though John Doe is linked to fifteen other objects, the QBO technique of this invention organizes and stages the links, using the typical statistical distribution of the links, into their various classes, distilling them into fewer, more easily digested subgroups and applies temporal, pluralization and other modifications to the subgroup headings to best communicate the summarization and content to the user.

FIG. 8 depicts the output using the outline of FIG. 7 where the user requested that all of the subheadings presented under John Doe in FIG. 7 were to be expanded to reveal the objects and sub-headings each heading represents. Notice in FIG. 8 that some objects, such as John's memberships in the Association for Computing Machinery and MENSA are grouped by their link class of membership, while others, such as his vehicles, are grouped by their object classification of vehicles, while others, such as his mother and sisters, and his horse and dog are grouped by their broader parent link and object classes of family and animals, respectively.

The link class of "Busboy", that ties John Doe to the Hard Rock Cafe, has been transformed to the past tense by the method of this invention by the addition of the word "Former", as shown in FIG. 8. The method of this invention automatically transforms to past or future tense, as required, the links that have expired, have yet to commence, or are scheduled to commence again based on user-defined temporal information stored in the codified links.

Figure 9:
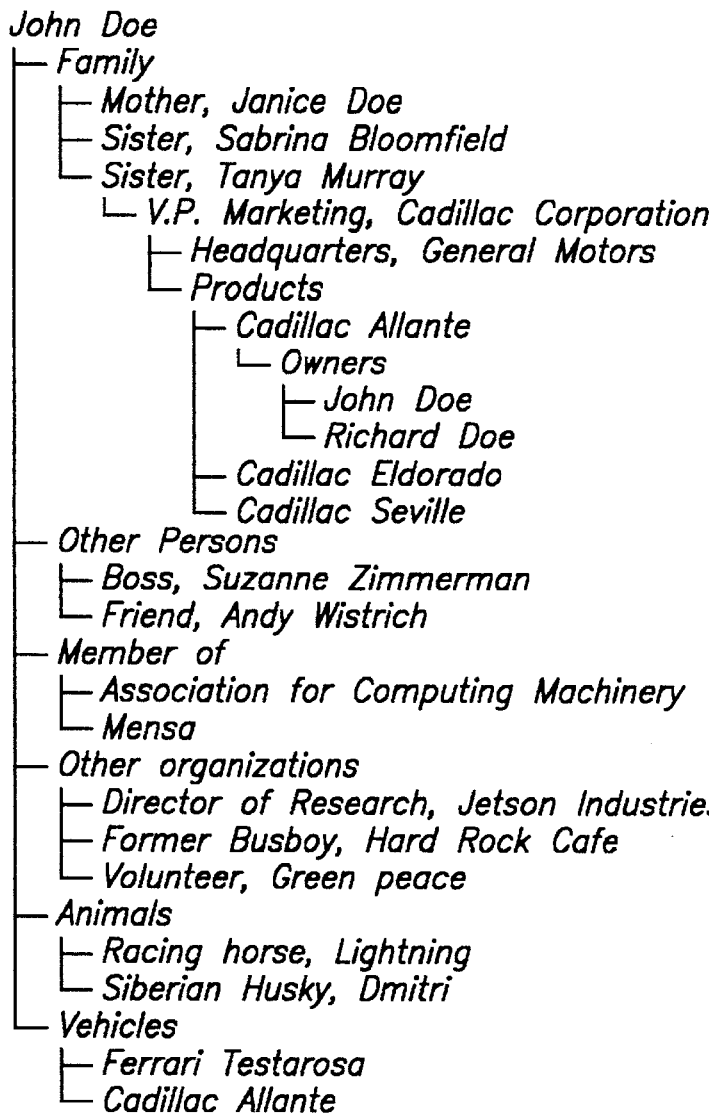

FIG. 9 depicts the output where the user designated Tanya Murray as the new object of interest, causing the creation and addition of subordinate entries that represent information related to her, and then designated the organization where she works, Cadillac Corporation, as the object of interest, revealing information related to Cadillac Corporation.

Notice in FIG. 9 how the method of the invention automatically replicates or clones the objects Cadillac Allante as a product of Cadillac Corporation and John Doe as a Cadillac Allante owner to show them from all relevant perspectives simultaneously. This is the result of their being inventoried and outputted each time they are referenced by some object of interest, even when they may already appear in the output.

Figure 10:
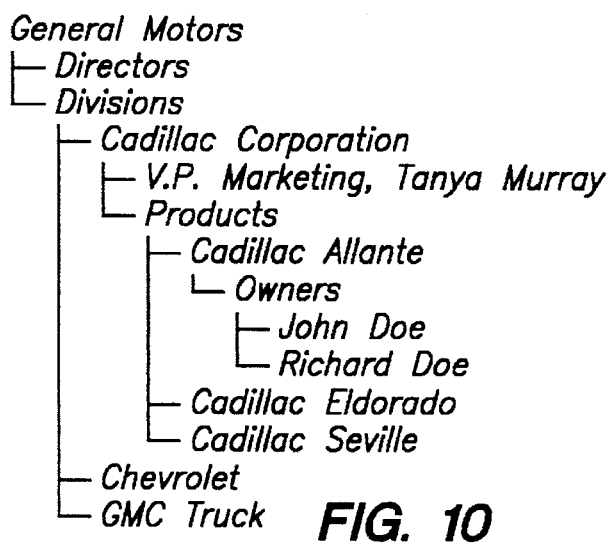

The entire perspective of the output may be changed at the user's request. For example, the user may designate General Motors as the new object of interest, and request that General Motors be hoisted to the focal-point of the output. This process of hoisting General Motors causes all information linked to General Motors, whether presented at all, presented above or presented below it in the prior output, to be organized subordinate to and from the perspective of General Motors. FIG. 10 illustrates the output resulting from hoisting General Motors and then expanding various subordinate entries to the object of interest, General Motors, to reveal the information represented by those subordinate entries.

FIG. 11 illustrates the output after hoisting Cadillac Allante into the primary focus of the output. Hoisting causes the output to be cleared and Cadillac Allante to be inserted at the top of the output. The links from Cadillac Allante are inventoried, as are the objects referenced by the links, and the subordinate entries of "Owners" and "Manufacturer, Cadillac Corporation" are created. The "Owners" entry represents a group of objects, John and Richard Doe, both of whom are linked to Cadillac Allante with links of the class "Owner" while the "Manufacturer, Cadillac Corporation" entry represents the link type of "Manufacturer" and the object of the "Manufacturer" link, "Cadillac Corporation". The links from Cadillac Corporation are inventoried and summarized under Cadillac Corporation as the subordinate entries "V. P. Marketing, Tanya Murray", "Headquarters, General Motors" and "Other products". The entries "Headquarters, General Motors" and "Other products" have been similarly expanded to reveal the objects or groups they represent.

FIG. 12 depicts the output when Richard Doe is hoisted into the focus of the output. The entry "Documents" represents a group of linked objects having the same object parent class of "Document". Some of the objects are of the object sub-class "Letter" and some of the object sub-class "Personal". The "Personal" heading has been expanded to reveal the two personal documents linked to Richard Doe. The additional information in the output for the first personal document indicates that the object consists of a file named RESUME.DOC last updated on Oct. 28, 1989, while the second personal document is a file fragment 97,316 characters in length last updated on Nov. 15, 1989.

FIG. 12 also depicts the use of entry cue symbols which are used to cue the user about the characteristics of each object represented by the various headings. The system of the present invention implements a number of different cue symbols, some of which are used in the examples that follow. These cue symbols may be altered, enhanced or reduced to fit the needs of the implementation and are used here for example purposes only and not as a representation of an exhaustive set of such cue symbols.

Examples of Cue Symbols

The plus symbol (+) to indicate subordinate entries exist but are not displayed.

The minus symbol (−) to indicate subordinate entries exist and are being displayed.

The dot symbol (•) to indicate that no subordinate entries exist.

The lightning bolt symbol (*f*) to indicate that an action is represented by the entry, such action being editable if the entry is made the object of interest, and which may be executed if the user requests.

The folder symbol for groups of related disk files or file fragments, such folder's properties being editable if the entry is made the object of interest.

The sheet of paper symbol for individual files, such as RESUME.DOC, or fragments such as the portion of an autobiography document that represents chapter 3. The properties of these entries are editable if made the object of interest.

FIG. 13 depicts the same output as FIG. 12 but adds a numerical value display to cue the user as to the number of levels of subordinate information represented by each entry.

Automatic Outline Generation

QBO implements basic outlining functions, such as expanding and collapsing subordinate levels, but creates the outline for the user from the network of connections that are defined. Not only is the user not required to construct fixed outlines of his/her data from the beginning, but QBO implements a hoist function that hoists a selected object to the focus of the outline and then automatically outlines all of its connections with subordinate headings causing a re-hierarching of the network of information from the perspective of the hoisted object. The hoist facilities in prior art outlining systems hoist an object up to the top, but do not re-outline everything, including all objects linked to the hoisted object, whether such objects are presented at all, presented above or presented below the object. The hoist facilities in prior art outlining systems operate more like pruning facilities that remove any information related to the object which is not displayed below the object instead of providing a refocus and presentation of all related information, as is provided by this invention.

Multiple, recursive and circular references to the same object cause automatic cloning of objects in an outline so that all relationships can easily be seen. Notice in FIG. 9 that Cadillac Allante is presented first as a product of the Cadillac Corporation, a division of General Motors where Gerald's sister works, and again as one of John's vehicles. Prior art outlining systems require the user to manually create the outline structures from the beginning in each possible perspective required, and then to manually clone items that need to appear from each perspective. The system of the present invention does this automatically from any perspective the user designates.

The QBO feature of the invention is more powerful, more automatic and provides new capabilities that capitalize on the capability of the method of this invention to support and interpret arbitrary networks of classified, sub-classified and codified links between objects.

No particular programming language has been indicated for carrying out the various procedures described above, which can readily be done by those skilled in the art. Each user of a particular computer and operating system will be aware of the language that is most suitable for the immediate purpose. In practice, it has been found that a practical implementation of the present invention is accomplished in the Prolog and C languages.

Examples and implementation details of a preferred embodiment are provided in order to offer a thorough understanding of the invention. However it will be apparent to one skilled in the art that the present invention may be practiced in many ways beyond these specific examples or details.

While the present invention is particularly described with reference to examples of certain computer systems and peripheral devices, it should be understood that these too are for illustration only and should not be taken as limitations upon the invention. In addition, it is clear that the method and apparatus of the present invention have utility in many applications beyond those specifically described. Many changes and modifications may be made by one of ordinary skill in the art without departing from the spirit and scope of the invention, as set forth in the claims which follow.

I claim:

1. A computer implemented method of retrieving and displaying interrelated data stored according to class memberships, linkages between individual objects, or linkages between classes, upon identification of an object of interest, comprising:

retrieving information related to objects related to said object of interest wherein at least one related object is related to said object of interest by a rich link data structure;

accessing the rich link data structure to retrieve rich link relationship information including information associated with both the object of interest and the related object;

developing an arrangement of said related objects making use of the relationship information as well as information about said related objects themselves;

simplifying said arrangement for presentation by grouping said related objects into groups subordinate to said object of interest and determined at least in part by said relationship information and said information about said related objects; and displaying said simplified arrangement.

2. A computer implemented method of retrieving and displaying interrelated data stored according to class memberships, linkages between individual objects, or linkages between classes, upon identification of an object of interest, comprising:

retrieving information related to objects related to said object of interest wherein at least one related object is related to said object of interest by a rich link data structure;

accessing the rich link data structure to retrieve relationship information including information associated with both the object of interest and the related object;

developing an arrangement of said related objects making use of the relationship information retrieved from the rich link data structure as well as information about said related objects themselves;

simplifying said arrangement for presentation by grouping said related objects into groups subordinate to said object of interest and determined at least in part by said relationship information and said information about said related objects; and displaying an outline of said simplified arrangement.

3. A computer implemented method of retrieving and displaying interrelated data stored according to class memberships, linkages between individual objects, or linkages between classes, upon identification of an object of interest, comprising:

retrieving information related to objects related to said object of interest wherein at least one related object is related to said object of interest by a rich link data structure;

accessing the rich link data structure go retrieve relationship information including information associated with both the object of interest and the related object;

developing an arrangement of said related objects making use of the relationship information retrieved from the rich link data structure as well as information about said related objects themselves;

simplifying said arrangements for presentation by grouping said related objects into groups subordinate to said object of interest and determined at least in part by said relationship information and said information about said related objects;

displaying an outline of said simplified arrangement; and responding to an identification of a second object of interest by redisplaying said outline of said simplified arrangement to show the relationship between said second object of interest and the other related objects which may include the original object of interest, wherein the other related objects which may include the original object of interest are subordinate to said second object of interest.

4. A computer implemented method of retrieving and displaying interrelated data store according to class memberships, linkages between individual objects, or linkages between classes, upon identification of an object of interest, comprising:

retrieving information related to objects related to said object of interest wherein at least one related object is related to said object of interest by a rich link data structure;

accessing the rich link data structure to retrieve relationship information including information associated with both the object of interest and the related object;

developing an arrangement of said related objects making use of the relationship information retrieved from the rich link data structure as well as information about said related objects themselves;

simplifying said arrangement for presentation by grouping said related objects into groups subordinate to said object of interest and determined at least in part by said relationship information and said information about said related objects; and displaying an outline of said simplified arrangement, the outline using syntax to reflect at least one aspect of the nature of the relationship between the objects in said simplified arrangement.

5. The method of claim 4 wherein at least one aspect of the nature of the relationship of the objects in said simplified arrangement is temporal.

6. The method of claim 4 wherein at least one aspect of the nature of the relationship of the objects in said simplified arrangement is possessive.

7. The method of claim 4 wherein at least one aspect of the nature of the relationship of the objects in said simplified arrangement is pluralization.

8. A computer implemented method of storing and subsequently displaying interrelated data stored according to class memberships, linkages between individual objects, or linkages between classes, comprising:

retrieving information related to objects related to said object; of interest wherein at least one related object is related to said object of interest by a rich link data structure;

accessing the rich link data structure to retrieve relationship information including information associated with both the object of interest and the related object;

developing an arrangement of said related objects making use of the relationship information retrieved from the rich link data structure as well as information about said related objects themselves;

classifying said relationship information into relationship classifications, each of which is subordinate to said object of interest;

attaching to each of the relationship classifications data pertinent to that classification of said relationship;

displaying said interrelated data including said relationship classifications and their attached data; and displaying said arrangement.

* * * * *

UNITED STATES PATENT AND TRADEMARK OFFICE
CERTIFICATE OF CORRECTION

PATENT NO.: 5,652,880
DATED: July 29, 1997
INVENTOR: Gerald C. Seagraves

It is certified that error appears in the above-identified patent and that said Letters Patent is hereby corrected as shown below:

Column 17, line 46, delete the word "go" and insert in place thereof --to--.

Column 18, line 45, delete the ";" before the word "of".

Signed and Sealed this

Twenty-third Day of September, 1997

*Attest:*

BRUCE LEHMAN

*Attesting Officer*   *Commissioner of Patents and Trademarks*